(12) United States Patent
Prokhorov (10) Patent No.: US 8,473,151 B2
(45) Date of Patent: Jun. 25, 2013

(54) EXCURSION PREVENTION METHODS AND SYSTEMS

(75) Inventor: Danil V Prokhorov, Canton, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 460 days.

(21) Appl. No.: 12/750,075

(22) Filed: Mar. 30, 2010

(65) Prior Publication Data
US 2011/0246021 A1 Oct. 6, 2011

(51) Int. Cl.
*B60W 10/00* (2006.01)
(52) U.S. Cl.
CPC ............. *B60W 10/00* (2013.01); *Y10S 477/906* (2013.01); *Y10S 477/907* (2013.01)
USPC ............. 701/36; 477/107; 477/115; 477/189; 477/906; 477/907; 477/195; 180/271
(58) Field of Classification Search
CPC .......... B60W 2540/10; B60W 2540/12; B60W 2540/244; B60W 10/06; G06G 7/00
USPC ............... 701/36, 2; 477/195, 107, 115, 189, 477/906, 907; 180/271
See application file for complete search history.

(56) References Cited

U.S. PATENT DOCUMENTS

| | | |
|---|---|---|
| 3,630,304 A | 12/1971 | Sahinkaya |
| 3,684,049 A | 8/1972 | Kimura |
| 4,495,449 A | 1/1985 | Black et al. |
| 4,658,939 A | 4/1987 | Kircher et al. |
| 4,777,420 A | 10/1988 | Dadpey et al. |
| 4,867,288 A | 9/1989 | Simonyi et al. |
| 5,040,088 A | 8/1991 | Harrington et al. |
| 5,057,760 A | 10/1991 | Dadpey et al. |
| 5,113,721 A | 5/1992 | Polly |
| 5,323,318 A | 6/1994 | Hasegawa et al. |
| 5,376,869 A | 12/1994 | Konrad |
| 5,391,127 A | 2/1995 | Nishimura |
| 5,752,748 A | 5/1998 | Schramm et al. |

(Continued)

FOREIGN PATENT DOCUMENTS

| | | |
|---|---|---|
| DE | 19525552 A1 | 1/1997 |
| DE | 19912878 A1 | 4/2000 |
| EP | 0037564 | 10/1981 |
| FR | 2849811 A1 | 7/2004 |

OTHER PUBLICATIONS

International Search Report mailed Jun. 17, 2011 as it relates to PCT Application No. PCT/US2011/030296.

*Primary Examiner* — M. Thein
*Assistant Examiner* — Milena Racic
(74) *Attorney, Agent, or Firm* — Dinsmore & Shohl LLP (57) ABSTRACT

Excursion prevention methods and systems may include transmitting a speed signal from the vehicle speed sensor to the electronic control unit; transmitting a transmission signal from the transmission sensor to the electronic control unit; transmitting an accelerator pedal signal from the accelerator sensor to the electronic control unit; transmitting a brake pedal signal from the brake sensor to the electronic control unit; executing a machine readable control logic with the electronic control unit to determine if an excursion condition is present based on the speed of the vehicle, the status of the transmission, the application of the accelerator pedal of the vehicle, and the application of the brake pedal of the vehicle; and, transmitting an alert signal from the electronic control unit when the excursion condition is present.

18 Claims, 4 Drawing Sheets

U.S. PATENT DOCUMENTS

| | | | |
|---|---|---|---|
| 5,832,395 A * | 11/1998 | Takeda et al. | 701/22 |
| 5,999,875 A | 12/1999 | Bruedigam et al. | |
| 6,086,515 A | 7/2000 | Buschmann et al. | |
| 6,122,588 A | 9/2000 | Shehan et al. | |
| 6,179,395 B1 | 1/2001 | Schneider | |
| 6,321,144 B1 | 11/2001 | Crombez | |
| 6,325,470 B1 | 12/2001 | Schneider | |
| 6,349,253 B1 * | 2/2002 | Bellinger | 701/53 |
| 6,364,434 B1 | 4/2002 | Sway-Tin et al. | |
| 6,375,596 B1 | 4/2002 | Steeby | |
| 6,397,132 B1 | 5/2002 | Liu | |
| 6,523,912 B1 * | 2/2003 | Bond et al. | 303/9 |
| 6,527,076 B1 | 3/2003 | Polzin | |
| 6,541,938 B2 | 4/2003 | Okamura et al. | |
| 6,897,593 B1 * | 5/2005 | Fletcher | 310/195 |
| 6,953,415 B2 | 10/2005 | Kadota | |
| 7,032,697 B2 | 4/2006 | Lee | |
| 7,034,482 B2 | 4/2006 | Komiyama et al. | |
| 7,104,617 B2 | 9/2006 | Brown | |
| 7,151,355 B2 | 12/2006 | Izumi et al. | |
| 7,600,827 B2 | 10/2009 | Tamai et al. | |
| 7,806,802 B2 | 10/2010 | Silveri et al. | |
| 7,828,694 B2 | 11/2010 | Silveri et al. | |
| 8,033,955 B2 | 10/2011 | Farnsworth | |
| 8,145,374 B2 | 3/2012 | Farnsworth | |
| 2001/0032040 A1 | 10/2001 | Albert et al. | |
| 2002/0007241 A1 | 1/2002 | Kupper et al. | |
| 2003/0132664 A1 | 7/2003 | Grand et al. | |
| 2003/0184147 A1 | 10/2003 | Perach | |
| 2004/0040760 A1 | 3/2004 | Kadota | |
| 2004/0239270 A1 | 12/2004 | Sarraillon et al. | |
| 2005/0017580 A1 | 1/2005 | Cikanek et al. | |
| 2005/0143877 A1 | 6/2005 | Cikanek et al. | |
| 2005/0211478 A1 | 9/2005 | Sakuma et al. | |
| 2005/0246081 A1 | 11/2005 | Bonnet et al. | |
| 2006/0111823 A1 | 5/2006 | Tamai | |
| 2006/0220608 A1 | 10/2006 | Izumi et al. | |
| 2007/0067085 A1 | 3/2007 | Lu et al. | |
| 2007/0073466 A1 | 3/2007 | Tamai et al. | |
| 2007/0142978 A1 * | 6/2007 | Yamamura et al. | 701/1 |
| 2007/0188348 A1 * | 8/2007 | Bauer et al. | 340/905 |
| 2007/0191181 A1 | 8/2007 | Burns | |
| 2008/0054716 A1 | 3/2008 | Sato et al. | |
| 2008/0190680 A1 | 8/2008 | Kaneko et al. | |
| 2009/0062061 A1 | 3/2009 | Silveri et al. | |
| 2009/0265069 A1 * | 10/2009 | Desbrunes | 701/70 |
| 2010/0168967 A1 * | 7/2010 | Dlugoss et al. | 701/49 |

\* cited by examiner

EXCURSION PREVENTION METHODS AND SYSTEMS

TECHNICAL FIELD

The present specification relates to methods and systems for controlling a vehicle and, more specifically, to excursion prevention methods and systems for vehicles.

BACKGROUND

A vehicle may come to a rest on an inclined surface and remain at rest without the brakes of the vehicle being applied. For example, if a vehicle is in a drive gear, the driving force of the vehicle may be equal to and in opposition to the force of gravity acting on the vehicle when a vehicle comes to a stop on an incline. Under such circumstances, an absent minded driver may exit a stopped vehicle without taking the proper shut down actions. Such an exit of a stopped vehicle may cause the vehicle to move without the driver. This unsupervised motion, or vehicle excursion, is typically not desired.

Accordingly, a need exists for alternative methods and systems for excursion prevention in vehicles.

SUMMARY

In one embodiment, a method for operating an excursion prevention system including an electronic control unit in electrical communication with a vehicle speed sensor, a transmission sensor, an accelerator sensor, and a brake sensor, may include transmitting a speed signal from the vehicle speed sensor to the electronic control unit, wherein the speed signal is indicative of a speed of a vehicle; transmitting a transmission signal from the transmission sensor to the electronic control unit, wherein the transmission signal is indicative of a status of the transmission; transmitting an accelerator pedal signal from the accelerator sensor to the electronic control unit, wherein the accelerator pedal signal is indicative of the application of an accelerator pedal of the vehicle; transmitting a brake pedal signal from the brake sensor to the electronic control unit, wherein the brake pedal signal is indicative of the application of a brake pedal of the vehicle and executing a machine readable control logic with the electronic control unit to determine if an excursion condition is present based on the speed of the vehicle, the status of the transmission, the application of the accelerator pedal of the vehicle, and the application of the brake pedal of the vehicle. When the excursion condition is present, an alert signal is transmitted from the electronic control unit.

In another embodiment, an excursion prevention system for preventing vehicle excursions in a vehicle including a transmission including a park gear and a drive gear, may include an electronic control unit coupled to the vehicle and including a processor for executing machine readable instructions and an electronic memory. A vehicle speed sensor is in electrical communication with the electronic control unit and communicates a speed signal to an electronic control unit indicative of a speed of the vehicle. A transmission sensor is in electrical communication with the electronic control unit and communicates a transmission signal to the electronic control unit indicative of a status of the transmission. An accelerator sensor is in electrical communication with the electronic control unit and communicates an accelerator pedal signal to the electronic control unit indicative of an application of an accelerator pedal. A brake sensor is in electrical communication with the electronic control unit and communicates a brake pedal signal to the electronic control unit indicative of an application of a brake pedal. The electronic memory executes a machine readable control logic stored in the electronic memory to: determine if the speed of the vehicle is zero; determine if the transmission of the vehicle is in the drive gear; determine if the accelerator pedal of the vehicle is applied; determine if the brake pedal of the vehicle is applied; determine if an excursion condition is present based at least in part on the speed of the vehicle, the status of the transmission, an application of the accelerator pedal of the vehicle, and an application of the brake pedal of the vehicle; and transmit an alert signal when the excursion condition is present.

In yet another embodiment, a method for operating an excursion prevention system including an electronic control unit in electrical communication with a vehicle speed sensor, a transmission sensor, an accelerator sensor, a brake sensor, and an occupancy sensor, may include: transmitting a speed signal from the vehicle speed sensor to the electronic control unit, wherein the speed signal indicative of a speed of a vehicle; transmitting a transmission signal from the transmission sensor to the electronic control unit, wherein the transmission signal is indicative of a status of the transmission; transmitting an accelerator pedal signal from the accelerator sensor to the electronic control unit, wherein the accelerator pedal signal is indicative of the application of an accelerator pedal of the vehicle; transmitting a brake pedal signal from the brake sensor to the electronic control unit, wherein the brake pedal signal is indicative of the application of a brake pedal of the vehicle; transmitting an occupancy signal from the occupancy sensor to the electronic control unit, wherein the occupancy signal is indicative of a driver's occupancy of the vehicle; and executing a machine readable control logic with the electronic control unit to determine if an excursion condition is present based on the speed of the vehicle, the status of the transmission, the application of the accelerator pedal of the vehicle, the application of the brake pedal of the vehicle, and the driver's occupancy of the vehicle. When the excursion condition is present, an alert signal is transmitted from the electronic control unit.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
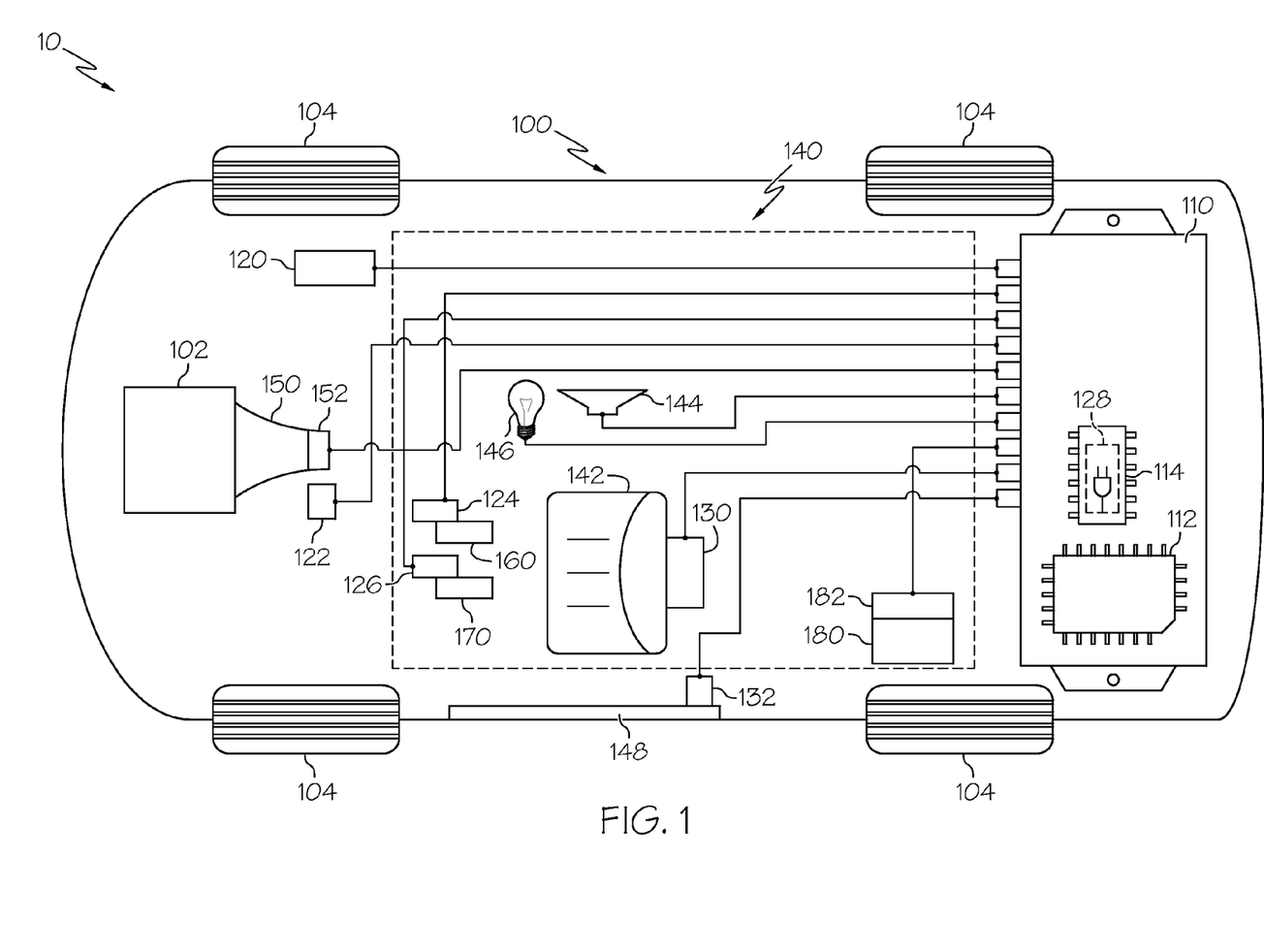
FIG. 1 schematically depicts a system for preventing vehicle excursions according to one or more embodiments shown and described herein.

FIG. 1 depicts one embodiment of an excursion prevention system. The system generally comprises an electronic control unit, a vehicle speed sensor, a transmission sensor, and a brake sensor. The system interprets the sensed values from the sensors and prevents vehicle excursions from occurring when the vehicle comes to rest on an inclined surface. Various embodiments of the system for preventing vehicle excursions and methods for preventing vehicle excursions will be described in more detail herein.

Referring now to FIG. 1, an embodiment of a vehicle 100 with a system 10 for preventing vehicle excursions is schematically depicted. The system 10 generally comprises an electronic control unit 110, comprising an electronic memory 114 with machine readable control logic 128, a vehicle speed sensor 120, a transmission sensor 122, an accelerator sensor 124, and a brake sensor 126. The system 10 is powered by the electrical system of the vehicle 100, e.g., via a battery and/or alternator, and cooperates with the vehicle 100 in order to prevent vehicle excursions.

The electronic control unit 110 comprises a processor 112 for executing machine readable instructions and is electrically coupled to an electronic memory 114 for storing machine readable instructions. The electronic control unit 110 is in electrical communication with the processor 112 and the electronic memory 114. The processor 112 may be an integrated circuit, a microchip, a computer, or any other computing device capable of executing machine readable instructions. The electronic memory may be RAM, ROM, a flash memory, a hard drive, or any device capable of storing machine readable instructions. In the embodiments described herein, the processor 112 and the electronic memory 114 are integral with the electronic control unit 110. However, it is noted that the electronic control unit 110, the processor 112, and the electronic memory 114 may be discrete components in electrical communication with one another without departing from the scope of the present disclosure. As used herein, the phrase "in electrical communication" means that the components are capable of transmitting electrical or electromagnetic signals with one another via a conductive medium such as for example, terminal blocks, posts, solder joints, integrated circuit traces, wires, and the like.

The vehicle speed sensor 120 communicates a speed signal indicative of the speed of the vehicle 100 to the electronic control unit 110. In one embodiment, the vehicle speed sensor 120 is physically coupled to the drive train (not shown) of the vehicle 100 near the output shaft of the transmission 150. The drive train comprises a motor 102 which transmits a driving force to at least one of the wheels 104 via a transmission 150. The vehicle speed sensor 120 is electromagnetically coupled to the output shaft of the transmission 150, and electromagnetically detects the rotational frequency of the output shaft of the transmission 150. For example, if the vehicle 100 is moving at a velocity of fifty miles per hour, the vehicle speed sensor 120 communicates a speed signal based on the rotational frequency of the output shaft indicative of the speed of the vehicle, and the electronic control unit 110 interprets the speed signal as an indication that the vehicle is moving at fifty miles per hour. Alternatively, the vehicle speed sensor 120 may measure vehicle speed by other means such as by measuring the rotation of the motor 102, the wheels 104, drive train components, via satellite, or sensing any vehicle speed input or vehicle speed output of any electrical component within the vehicle. It is noted that the term "sensor," as used herein, means a device that measures a physical quantity and converts it into an electrical signal which is correlated to the measured value of the physical quantity. Furthermore, the term "signal" means an electrical waveform, such as DC, AC, sinusoidal-wave, triangular-wave, square-wave, and the like, capable of traveling along a conductive medium.

The transmission sensor 122 is coupled to a transmission 150 and is in electrical communication with the electronic control unit 110. In the embodiments described herein, the transmission sensor 122 is coupled to the gear indicator in the instrument panel for a transmission 150 comprising a park gear and at least one drive gear, such as for example, reverse, drive, first gear, second gear, and the like. The transmission sensor 122 communicates a transmission signal indicative of the status of the transmission 150, i.e., whether the transmission is in the park gear or a drive gear, to the electronic control unit 110. The transmission 150 may be an automatic, a continuously variable transmission, or any other current or future transmission design comprising a park gear and at least one drive gear. In alternative embodiments, the transmission sensor 122 may be coupled to the transmission 150, the gear shifter, any input or output of a clutchless transmission or any vehicle transmission input or vehicle transmission output of any electrical component in the vehicle. Furthermore, it is noted that the term "gear" is used in a colloquial sense and is not intended to limit this disclosure to systems comprising mechanical gears.

Figure 2:
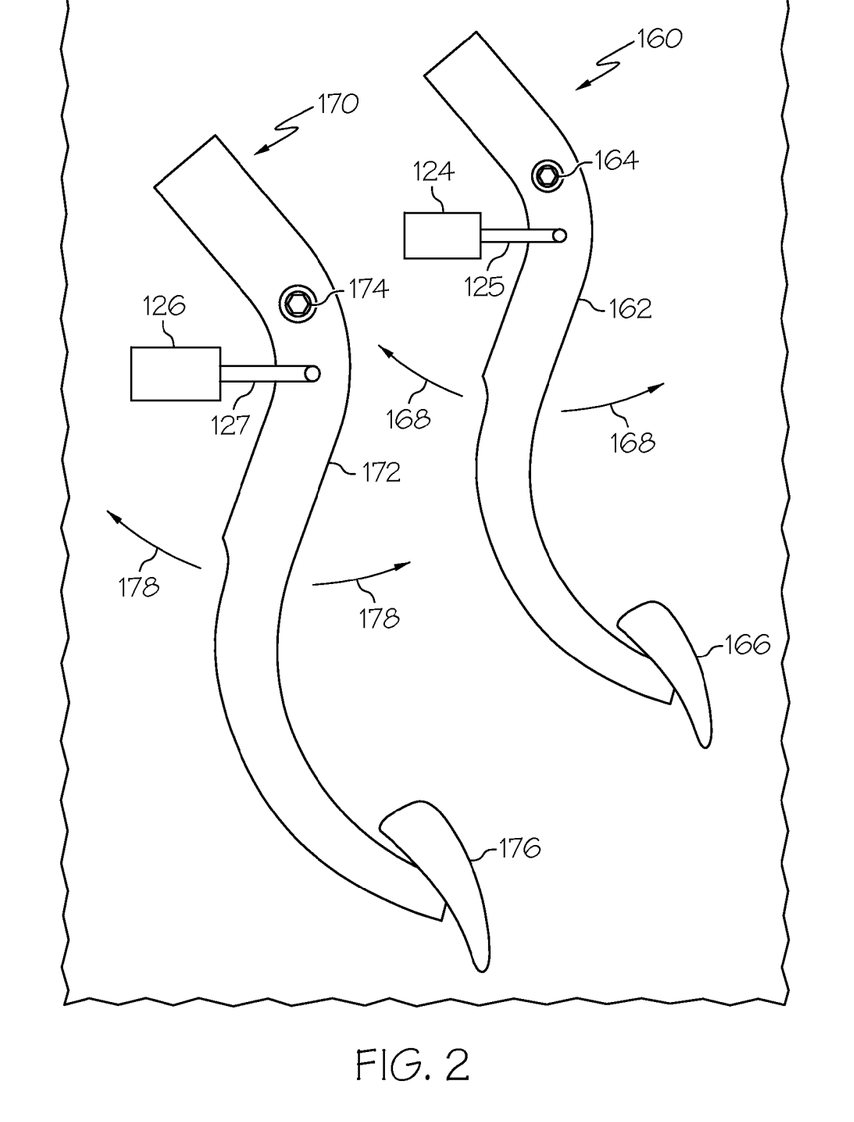
FIG. 2 schematically depicts a perspective view of a brake pedal and an accelerator pedal according to one or more embodiments shown and described herein.

Referring now to FIG. 2, the accelerator pedal 160 comprises an accelerator pedal body 162 that links an accelerator pivot 164 to an accelerator foot pad 166. The accelerator pedal 160 is pivotally engaged with the vehicle 100 via the accelerator pivot 164. The accelerator pedal 160 increases the drive force created by the motor 102 by, for example, increasing the amount of air and fuel supplied to the motor 102 when the accelerator pedal 160 is applied. The accelerator pedal 160 is applied by rotating the accelerator pedal 160 about the accelerator pivot 164 in an accelerator actuation motion 168. The accelerator sensor 124 is coupled to the accelerator pedal 160 and is in electrical communication with the electronic control unit 110. In the embodiments described herein, the accelerator sensor 124 is a positional sensor that comprises a moving accelerator arm 125 that moves with the accelerator pedal 160, and alters an electrical output based on the position of the accelerator pedal 160. Thus, the accelerator sensor 124 communicates a accelerator pedal signal indicative of the application of the accelerator pedal 160 to the electronic control unit 110.

Still referring to FIG. 2, the vehicle 100 also comprises a brake pedal for activating a brake system of the vehicle. The brake pedal 170 comprises a brake pedal body 172 that links a brake pivot 174 to a brake foot pad 176. The brake pedal 170 is pivotally engaged with the vehicle 100 via the brake pivot 174. The brake pedal 170 influences the motion of the vehicle 100 by, for example, actuating a brake system of the vehicle 100. The brake pedal 170 is applied by rotating the brake pedal 170 about the brake pivot 174 in a brake actuation motion 178. The brake sensor 126 is coupled to the brake pedal 170 and is in electrical communication with the electronic control unit 110. In one embodiment, the brake sensor 126 is a positional sensor that comprises a moving brake arm 127 that moves with the brake pedal 170 and alters an electrical output based on the position of the brake pedal 170. Accordingly, it will be understood that the brake sensor 126 communicates a brake pedal signal indicative of the application of the brake pedal 170 to the electronic control unit 110.

It is noted that, while the accelerator pedal 160 and the brake pedal 170 are depicted as mechanical linkages, the pedals 160 and 170 may be hydraulic, electronic, electromechanical, or the like. Furthermore, it is noted that while the accelerator sensor 124 and the brake sensor 126 are depicted as linear position sensors, they may be rotary positional sensors disposed about the accelerator pivot 164 and the brake pivot 174, respectively. Additionally, the sensors 124 and 126 may measure voltage, current, or resistance, rather than position directly, when operating in conjunction with the electronic control unit 110, such as in a drive by wire system, or by sensing any pedal actuation input or any pedal actuation output of any electrical component in the vehicle.

In one embodiment, the system 10 further comprises one or more sensors for determining if an occupant is positioned in the driver's seat of the vehicle and/or is exiting the vehicle. For example, in one embodiment, the system further comprises a seat sensor 130. The seat sensor 130 is connected to a driver's seat 142 disposed within the passenger compartment. The seat sensor 130 communicates a seat signal indicative of a person occupying the driver's seat to the electronic control unit 110. The seat signal may be indicative of pressure, force, mass, or temperature. Alternatively, the occupancy of the driver's seat may be monitored via an optical system, such as a camera, or may be sensed by sensing the driver's seat occupancy input or driver's seat occupancy output of any electrical component in the vehicle.

Figure 3A:
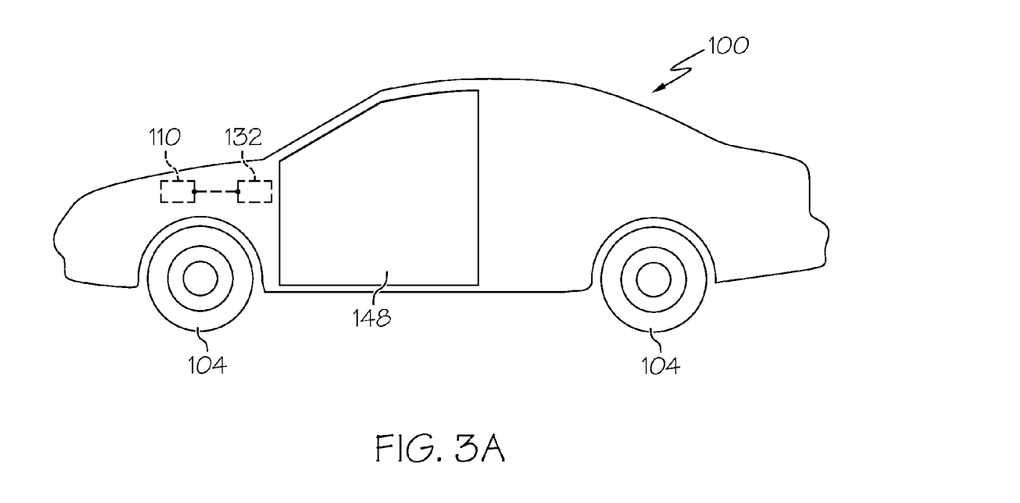
FIG. 3A schematically depicts a side view of a vehicle according to one or more embodiments shown and described herein.
Figure 3B:
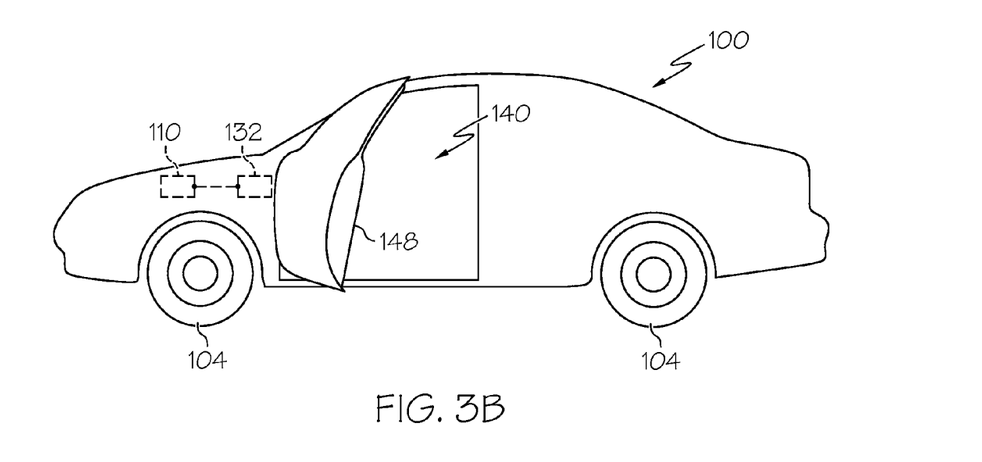
FIG. 3B schematically depicts a side view of a vehicle according to one or more embodiments shown and described herein.

FIGS. 3A and 3B depict another embodiment of the system 10. In this embodiment the vehicle further comprises a door sensor 132. The door sensor 132 is connected to the driver's door 148 and is in electrical communication with the electronic control unit 110. The driver's door 148 is movably engaged with the vehicle 100 and may be moved between a closed position (FIG. 3A) and an open position (FIG. 3B). The door sensor 132 communicates a door signal indicative of the status of the driver's door 148 (i.e. open or closed) to the electronic control unit 110. In one embodiment the door sensor is a continuity sensor. While, the door sensor 132 is described as a continuity sensor, it is contemplated that a switch or an optical system may be employed to determine the status of the door. Furthermore, the door sensor 132 may sense the door position input or door position output of any electrical component in the vehicle.

Referring again to FIG. 1, the vehicle 100 may also comprise an emergency brake 180 coupled to the vehicle 100 and a brake system (not shown) of the vehicle. The emergency brake 180 may be applied by an emergency brake actuator 182. The emergency brake actuator 182 is in electrical communication with the electronic control unit 110, and may be any mechanical or electro-mechanical system capable of applying the emergency brake 180. In one embodiment, an emergency brake actuator may also be disposed within the passenger compartment 140 and actuated manually.

Still referring to FIG. 1, the system 10 for preventing vehicle excursions also comprises a transmission actuator 152 in electrical communication with the electronic control unit 110. The transmission actuator 152 may be mechanically coupled to the transmission and may be any mechanical or electromechanical system capable of shifting the transmission 150.

The system 10 may further include an indicator, such as an audible indicator 144 or a visual indicator 146. Still further embodiments comprise an audible indicator 144, a visual indicator 146, or combinations thereof. The audible indicator 144 emits an audible indication upon receipt of an alert signal, such as an alert signal transmitted by the electronic control unit 110. The audible indicator 144 is disposed within the passenger compartment 140 and may be part of the audio entertainment system or an auxiliary system. The visual indicator 146 emits a visible indication upon receipt of an alert signal, such as an alert signal transmitted by the electronic control unit 110. The visual indicator is disposed within the passenger compartment 140, typically on the instrument panel of the vehicle. The visual indicator can be any component that creates a visible indication, such as for example, an LED, an incandescent lamp, and the like.

Referring again to FIG. 1, the system 10 for preventing vehicle excursions in a vehicle 100 comprises machine readable control logic 128 stored in the electronic memory 114 of the electronic control unit 110. The processor 112 of the electronic control unit 110 reads the machine readable control logic 128 and executes the machine readable control logic 128 to prevent vehicle excursions. The electronic control unit 110 processes signals supplied to the electronic control unit 110 from sensors throughout the vehicle, such as for example, the vehicle speed sensor 120, the transmission sensor 122, the accelerator sensor 124, and the brake sensor 126. Additionally, it is noted that, the machine readable control logic 128 may be firmware integral with the processor 112.

Figure 4A:
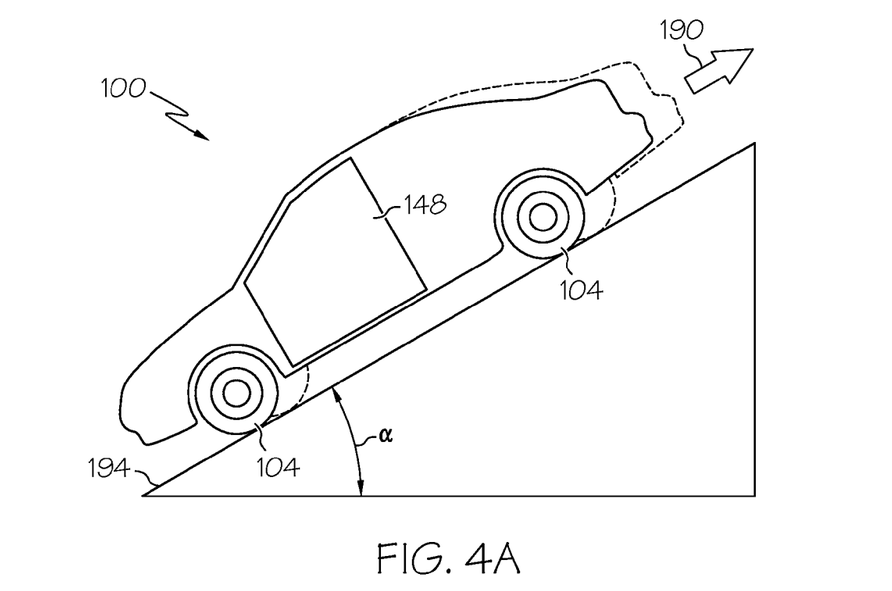
FIG. 4A schematically depicts a vehicle excursion according to one or more embodiments shown and described herein.
Figure 4B:
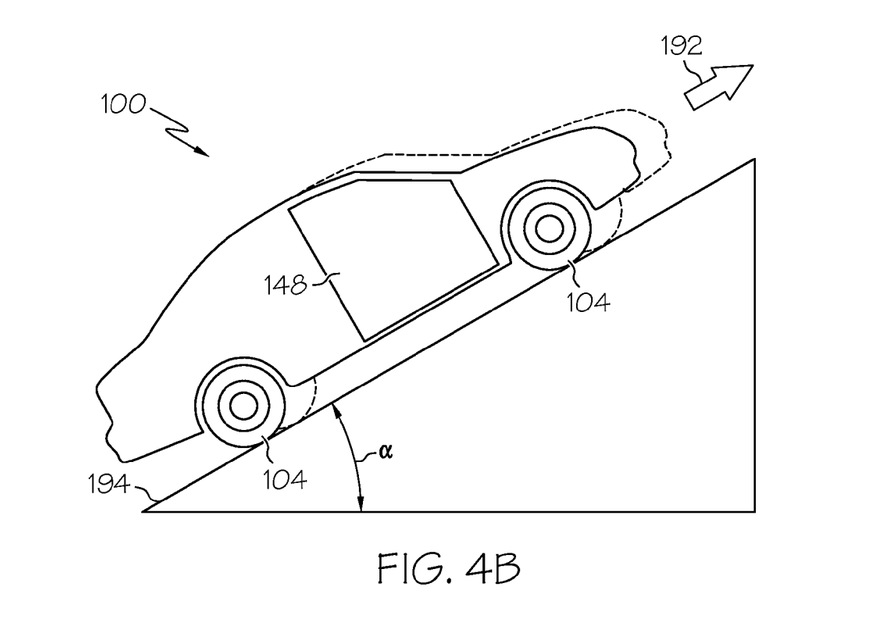
FIG. 4B schematically depicts a vehicle excursion according to one or more embodiments shown and described herein.

The systems described herein may be utilized to prevent excursions of vehicles. A vehicle excursion may occur when a vehicle is in a drive gear and the driver exits the vehicle without putting the vehicle in the park gear. Examples of excursions are depicted in FIGS. 4A and 4B. The vehicle 100 may come to a rest on an inclined surface 194 having an angle of inclination α. An excursion condition may be present when the transmission 150 is in a drive gear and the motor 102 is delivering a driving force to at least one of the wheels 104, e.g. reverse (FIG. 4A), and the vehicle 100 is stopped and at equilibrium. An equilibrium is present when the driving force of the vehicle 100 up the inclined surface 194 is equal and in opposition to the force of gravity opposing the driving force down the inclined surface 194. Thus, if the vehicle is in an equilibrium condition and the total mass of the vehicle 100 changes, for example by the driver exiting the vehicle 100, an excursion condition is present, and the equilibrium condition is no longer present and the vehicle 100 would move in a reverse excursion direction 190. Similarly, if the vehicle 100 were in a forward drive gear under the conditions shown in FIG. 4B, the vehicle 100 would move in a forward excursion direction 192. The reverse and forward excursion conditions may be prevented by utilizing the system described herein.

For example, referring to FIGS. 1 and 4B, the vehicle 100 may be at rest on an inclined surface 194 by reaching an equilibrium between the driving force up the inclined surface 194 and the gravitational force down the inclined surface 194. In this condition, the vehicle may remain motionless without the brake pedal 170 or the accelerator pedal 160 being applied. Or put another way, the vehicle 100 is in a drive gear and motionless without driver interaction. While, an equilibrium condition is not an excursion condition, an equilibrium condition can be utilized as an analog to prevent vehicle excursions. For example, in an embodiment, the electronic control unit 110 determines that an excursion condition is present based on the speed, the status of the transmission 150, the application of the accelerator pedal 160, and the application of the brake pedal 170 by processing the electrical signals from the vehicle speed sensor 120, the transmission sensor 122, the accelerator sensor 124, and the brake sensor 126. Once the excursion condition is determined to be present, the electronic control unit 110 transmits an alert signal to prevent an excursion of the vehicle. In another embodiment of the present disclosure, depicted in FIGS. 1 and 4B the electronic control unit 110 determines that an excursion condition is present because the speed of the vehicle 100 is zero, the transmission 150 is in a drive gear, the accelerator pedal 160 is unapplied, and the brake pedal 170 is unapplied. When an excursion condition is present the electronic control unit 110 transmits an alert signal. For example, the electronic control unit 110 may cause the transmission actuator 152 to shift the transmission 150 to park.

In one embodiment, the alert signal is utilized in a passive manner. For example, the electronic control unit 110 transmits an alert signal to the audible indicator 144 causing the audible indicator 144 to emit an audible indication. The audible indication can be an alarm or an audible warning. In another embodiment, the electronic control unit 110 transmits an alert signal to the visual indicator 146 causing it to emit a visible indication. Alternatively, the system may provide both an audible indication and a visual indication simultaneously.

In still further embodiments of the present disclosure, the alert signal may be utilized in an active manner to prevent excursions. Upon determining that an excursion condition is present, the electronic control unit 110 transmits the alert signal to the transmission actuator 152 causing the transmission actuator 152 to shift the transmission 150 to the park gear. In another embodiment, the electronic control unit 110 transmits the alert signal to the emergency brake actuator 182 which applies the emergency brake 180 upon receipt of the alert signal. It is noted that, the electronic control unit 110 may transmit the alert signal to the audible indicator 144, the visual indicator 146, the transmission actuator 152, the emergency brake actuator 182, or combinations thereof. For example, the control unit may apply both the emergency brake 180 and shift the transmission 150 to park while also providing visual and/or audible indications.

In an embodiment of the present disclosure, as depicted in FIGS. 1 and 4A, a delay is utilized as a mechanism to minimize false detections of excursion conditions. For example, if the vehicle 100 is stopped in gear at a stop light in an equilibrium condition (i.e. the drive force is equal and opposite to the gravitational force) an instantaneous measurement of the vehicle speed sensor 120, the transmission sensor 122, the accelerator sensor 124, and the brake sensor 126 would indicate that an excursion condition is present. However, since the driver is occupying and in control of the vehicle 100, the detection of an excursion condition is not desired. Such an undesired detection of an excursion condition can be minimized by utilizing a delay. For example, the driver may activate the brake pedal 170 after being stopped at the light for a brief period, and thus, prevent an excursion condition from being present. Therefore, a delay reduces the number and probability of false detections. The delay may be a predetermined time interval which accounts for typical pauses in driver interaction during normal driving. For example, the delay may be a time interval from about 1 millisecond to about 25 seconds to avoid the transmission of alert signals when the excursion condition is not present, such as for example, when the vehicle 100 is at an equilibrium condition at a stop light. Additionally, normal driving activity may include stopping, parallel parking, backing a boat trailer into a lake, and any other activity where a driver intentional directs the vehicle to come to rest at an equilibrium condition.

In embodiments of the system 10, the electronic control unit 110 indicates that an excursion condition is possible by, for example, executing a machine readable control logic 128 to initiate a delay when the speed of the vehicle 100 is zero and when the transmission 150 of the vehicle 100 is in the drive gear. The electronic control unit 110 executes the machine readable control logic 128 to confirm that an excursion condition is present when a predetermined time interval has elapsed, the speed is zero, the transmission 150 is in a drive gear, the accelerator pedal 160 is unapplied, and the brake pedal 170 is unapplied. In further embodiments, the delay may be initiated based on the speed, the status of the transmission 150, the application of the accelerator pedal 160, the application of the brake pedal 170, and combinations thereof. For example, the delay may be initiated when the speed is zero, the transmission 150 is in drive, and the brake pedal 170 is unapplied.

In further embodiments, depicted in FIG. 1, the electronic control unit 110 executes the machine readable control logic 128 to monitor the presence of the driver within the vehicle 100 in addition to the speed, the status of the transmission 150, the application of the accelerator pedal 160, and the application of the brake pedal 170. The presence of the driver within the vehicle reduces the probability that an excursion condition exists. Undesired detections can be reduced by including the presence of the driver as part of the determination of an excursion condition. In one embodiment, the occupancy of the driver's seat 142 and/or a potential change in the occupancy of the driver's seat 142 is utilized to determine if an excursion condition is present. An occupancy signal indicative of a driver's occupancy of the vehicle 100 is transmitted from an occupancy sensor to the electronic control unit. Then, the electronic control unit 110 determines if an excursion condition is present based on the speed, the transmission 150, the application of the accelerator pedal 160, the application of the brake pedal 170, and the occupancy of the vehicle 100. The occupancy sensor may be the seat sensor 130, the door sensor 132, an optical sensor, or combinations thereof For example, in one embodiment, the determination that the excursion condition is present is based, at least in part on whether the driver's door 148 of the vehicle 100 is open. The door sensor 132 may be utilized to anticipate a possible change in the occupancy of the driver's seat 142. For example, if the driver's door 148 of the vehicle 100 opens (FIG. 3B), a door signal indicative of the position of the driver's door 148 is communicated to the electronic control unit 110 by the door sensor 132. In another embodiment, depicted in FIG. 1, the determination that the excursion condition is present is based, at least in part on occupancy information provided to the electronic control unit 110 by the seat sensor 130. For example, if the driver's seat 142 is occupied the seat sensor transmits a seat signal indicative of the driver's presence to the electronic control unit 110 comprising mass, or temperature information.

It should now be understood that the embodiments described herein relate to excursion prevention methods and systems. The methods and systems interpret sensed values from sensors and mitigate the occurrence of vehicle excursions. A system may comprise an electronic control unit, a vehicle speed sensor, a transmission sensor, an accelerator sensor and a brake sensor. After the vehicle comes to rest on an inclined surface and a driver exits the vehicle, the sensors transmit electrical signals to the electronic control unit indicative of the impending vehicle excursion. The electronic control unit determines that the vehicle excursion is present based on the electrical signals, and transmits an alert signal. The alert signal can then be received by components of the vehicle and activate preventative measures to mitigate the occurrence of vehicle excursions.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method for operating an excursion prevention system having an electronic control unit in electrical communication with a vehicle speed sensor, a transmission sensor, an accelerator sensor, and a brake sensor, the method comprising:
   transmitting a speed signal from the vehicle speed sensor to the electronic control unit, wherein the speed signal is indicative of a speed of a vehicle;
   transmitting a transmission signal from the transmission sensor to the electronic control unit, wherein the transmission signal is indicative of a status of the transmission;
   transmitting an accelerator pedal signal from the accelerator sensor to the electronic control unit, wherein the accelerator pedal signal is indicative of an application of an accelerator pedal of the vehicle;
   transmitting a brake pedal signal from the brake sensor to the electronic control unit, wherein the brake pedal signal is indicative of an application of a brake pedal of the vehicle;
   executing a machine readable control logic with the electronic control unit to determine that an excursion condition is present when the speed of the vehicle is zero, the transmission of the vehicle is in a drive gear, the accelerator pedal of the vehicle is unapplied, and the brake pedal of the vehicle is unapplied; and
   transmitting an alert signal from the electronic control unit when the excursion condition is present.

2. The method of claim 1 wherein the alert signal is an audible indication or a visible indication.

3. The method of claim 1 wherein the alert signal shifts the transmission to a park gear, applies an emergency brake of the vehicle, or combinations thereof.

4. The method of claim 1 further comprising:
   executing the machine readable control logic with the electronic control unit to initiate a delay time interval when the speed of the vehicle is zero and when the transmission of the vehicle is in a drive gear, wherein the excursion condition is present when:
   the speed of the vehicle is zero after the delay time interval has elapsed;
   the transmission of the vehicle is in the drive gear after the delay time interval has elapsed;
   the accelerator pedal is unapplied after the delay time interval has elapsed; and
   the brake pedal is unapplied after the delay time interval has elapsed.

5. The method of claim 4 wherein the predetermined time interval is from about 1 millisecond to about 25 seconds.

6. An excursion prevention system for preventing vehicle excursions in a vehicle comprising a transmission having a park gear and a drive gear, the system comprising:
   an electronic control unit coupled to the vehicle and comprising a processor for executing machine readable instructions and an electronic memory;
   a vehicle speed sensor in electrical communication with the electronic control unit, wherein the vehicle speed sensor communicates a speed signal to an electronic control unit indicative of a speed of the vehicle;
   a transmission sensor in electrical communication with the electronic control unit, wherein the transmission sensor communicates a transmission signal to the electronic control unit indicative of a status of the transmission;
   an accelerator sensor in electrical communication with the electronic control unit, wherein the accelerator sensor communicates an accelerator pedal signal to the electronic control unit indicative of an application of an accelerator pedal;
   a brake sensor in electrical communication with the electronic control unit, wherein the brake sensor communicates a brake pedal signal to the electronic control unit indicative of an application of a brake pedal; and
   a machine readable control logic stored in the electronic memory, wherein the electronic control unit executes the machine readable control logic to:
   determine if the speed of the vehicle is zero;
   determine if the transmission of the vehicle is in the drive gear;
   determine if the accelerator pedal of the vehicle is applied;
   determine if the brake pedal of the vehicle is applied;
   determine that an excursion condition is present when the speed of the vehicle is zero, the transmission of the vehicle is in a drive gear, the accelerator pedal of the vehicle is unapplied, and the brake pedal of the vehicle is unapplied; and
   transmit an alert signal when the excursion condition is present.

7. The system of claim 6 further comprising an audible indicator in electrical communication with the electronic control unit, wherein the electronic control unit transmits the alert signal to the audible indicator, and the audible indicator emits an audible indication upon receipt of the alert signal from the electronic control unit.

8. The system of claim 6 further comprising a visual indicator in electrical communication with the electronic control unit, wherein the electronic control unit transmits the alert signal to the visual indicator and the visual indicator emits a visible indication upon receipt of the alert signal from the electronic control unit.

9. The system of claim 6 further comprising a transmission actuator in electrical communication with the electronic control unit, wherein the electronic control unit transmits the alert signal to the transmission actuator and the transmission actuator shifts the transmission to the park gear upon receipt of the alert signal from the electronic control unit.

10. The system of claim 6 further comprising an emergency brake coupled to the vehicle and comprising an emergency brake actuator in electrical communication with the electronic control unit, wherein the electronic control unit transmits the alert signal to the emergency brake actuator and the emergency brake actuator activates the emergency brake upon receipt of the alert signal from the electronic control unit.

11. The system of claim 6 wherein the electronic control unit executes the machine readable control logic to:
   initiate a delay when the vehicle speed is zero and when the transmission is in the drive gear; and determine if the excursion condition is present after a delay time interval has elapsed and the vehicle speed is zero, the transmission is in the drive gear, the accelerator pedal is unapplied and the brake pedal is unapplied.

12. The system of claim 11 wherein the predetermined time interval is from about 1 millisecond to about 25 seconds.

13. The system of claim 6 further comprising:
a driver's seat disposed within a passenger compartment of the vehicle;
a seat sensor connected with the driver's seat and in electrical communication with the electronic control unit, wherein the seat sensor communicates a seat signal to the electronic control unit indicative of a person occupying the driver's seat; and
the excursion condition is present when
the seat is not occupied.

14. The system of claim 13 wherein the seat signal is indicative of mass or temperature.

15. The system of claim 6 further comprising:
a driver's door movably engaged with the vehicle;
a door sensor connected with the driver's door and in electrical communication with the electronic control unit, wherein the door sensor communicates a door signal to the electronic control unit indicative of a status of the driver's door; and
the excursion condition is present when
the driver's door is open.

16. A method for operating an excursion prevention system having an electronic control unit in electrical communication with a vehicle speed sensor, a transmission sensor, an accelerator sensor, a brake sensor, and an occupancy sensor, the method comprising:
transmitting a speed signal from the vehicle speed sensor to the electronic control unit, wherein the speed signal is indicative of a speed of a vehicle;
transmitting a transmission signal from the transmission sensor to the electronic control unit, wherein the transmission signal is indicative of a status of the transmission;
transmitting an accelerator pedal signal from the accelerator sensor to the electronic control unit, wherein the accelerator pedal signal is indicative of an application of an accelerator pedal of the vehicle;
transmitting a brake pedal signal from the brake sensor to the electronic control unit, wherein the brake pedal signal is indicative of an application of a brake pedal of the vehicle;
transmitting an occupancy signal from the occupancy sensor to the electronic control unit, wherein the occupancy signal is indicative of a driver's occupancy of the vehicle;
executing a machine readable control logic with the electronic control unit to determine that an excursion condition is present when the speed of the vehicle is zero, the transmission of the vehicle is in a drive gear, the accelerator pedal of the vehicle is unapplied, and the brake pedal of the vehicle is unapplied and the driver's occupancy of the vehicle; and
transmitting an alert signal from the electronic control unit when the excursion condition is present.

17. The method of claim 16 wherein:
the occupancy sensor is a door sensor;
the occupancy signal is indicative of a status of a driver's door of the vehicle: and
the excursion condition is present when
the driver's door of the vehicle is open.

18. The method of claim 16 wherein:
the occupancy sensor is a seat sensor; and
the excursion condition is present when
the driver's seat of the vehicle is not occupied.

* * * * *